United States Patent Office 3,755,580
Patented Aug. 28, 1973

3,755,580
INSECTICIDAL TRIAZINE DERIVATIVES
John E. Franz, Crestwood, Mo., assignor to
Monsanto Company, St. Louis, Mo.
No Drawing. Filed June 19, 1970, Ser. No. 47,877
Int. Cl. A01n 9/22
U.S. Cl. 424—249
12 Claims

ABSTRACT OF THE DISCLOSURE

Insecticidal compositions and methods utilizing triacyloxy hexahydrotriazines in which the acyl group can have an alkyl, haloalkyl, phenylalkyl, phenylalkenyl, furan orf substituted phenyl substituent.

---

This invention relates to triacyloxy hexahydrotriazines and insecticidal compositions and methods utilizing at least one of them.

The compounds of this invention can be represented by the formula

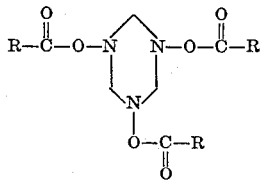

wherein R is hydrogen, alkyl or haloalkyl having at least 1 and a maximum of 18 carbon atoms, cycloalkyl having at least 3 and a maximum of 4 carbon atoms, phenylalkyl having at least 7 and a maximum of 8 carbon atoms, phenylalkenyl having at least 8 and a maximum of 9 carbon atoms, furan, or a substituted phenyl of the formula

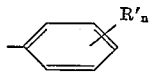

wherein R' is selected from the group consisting of hydrogen, alkyl or alkoxy having at least 1 and a maximum of 6 carbon atoms, nitro or halogen, and $n$ is an integer from 0 through 4.

The compounds of this invention, may, in general, be prepared by reacting a polyformaldehyde oxime of the formula

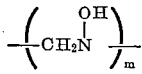

with an acid chloride or anhydride of the formula

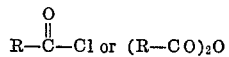

wherein R is as previously defined, and $m$ is an integer from 1 to 100. The reaction can conveniently be carried out in an inert organic solvent such as methylene chloride, chloroform, benzene, chlorobenzene, carbon disulfide, nitromethane, nitrobenzene and the like, the preferred solvent being methylene chloride. In general, good results are obtained by reacting the polyformaldehyde oxime and the acid chloride in molar ratios of about 1:3. The reaction may be conducted in a temperature range of from about 20° C. to about 100° C. In the preferred method of operation, the reaction is conducted at a temperature range of 50° C. to 70° C., with refluxing. The reaction mixture is then maintained in said temperature range for a period of about 4 hours to about 30 hours, the period of time being dependent upon the acid chloride used and temperature employed.

Suitable acid chlorides for the practice of this invention are p-chlorobenzoyl chloride, 2,4 - dichlorobenzoyl chloride, 3,4 - dichlorobenzoyl chloride, m-nitrobenzoyl chloride, 3,5 - dinitrobenzoyl chloride, p-fluorobenzoyl chloride, o-fluorobenzoyl chloride, p-methoxybenzoyl chloride, benzoyl chloride, acetyl chloride, propionoyl chloride, hexanoyl chloride, isopropionoyl chloride, sec-butanoyl chloride, t-butanoyl chloride, pivaloyl chloride, 2,4,6 - trimethylbenzoyl chloride, p-methylbenzoyl chloride, 2,4 - dimethylbenzoyl chloride, p-ethylbenzoyl, 2,4-diethylbenzoyl chloride, 2,4 - di - t - butylbenzzoyl chloride, 2,4-dimethoxybenzoyl chloride, 2,4-dibromobenzoyl chloride, 2,4 - diiodobenzoyl chloride, cyclopropane carbonyl chloride, cinnamoyl chloride, and the like.

The following examples illustrate the present invention and are not to be construed as limiting. Parts are by weight unless otherwise stated.

EXAMPLE 1

1,2,3,4,5,6 - hexahydro - 1,3,5 - triazintriyl tri(m-fluorobenzoate) was prepared by the following procedure:

About 22.5 parts of polyformaldehyde oxime, 300 parts of methylene chloride and about 87 parts of m-fluorobenzoyl chloride were charged into a suitable reaction vessel provided with heating means, a reflux condenser and means for the application of reduced pressure. The mixture was heated to the reflux temperature and refluxed for a period of about 20 hours. At that time the resultant cloudy mixture was concentrated by the removal under reduced pressure of the methylene chloride, the residue washed with ether and subsequently recrystallized from a chloroform-ether mixture. The product which was identified as 1,2,3,4,5,6 - hexahydro - 1,3,5 - triazintriyl tri(m-fluorobenzoate) has a melting point of 175° C.

Analysis for $C_{26}H_{15}N_3O_6F_3$.—Calc'd (percent): C, 57.49; H, 3.62; N, 8.38; F, 11.37. Found (percent): C, 57.28; H, 3,53; N, 8.29; F, 11.55.

EXAMPLE 2

1,2,3,4,5,6 - hexahydro - 1,3,5 - triazintriyl tribenzoate was prepared by the following procedure:

A mixture of about 45 parts of polyformaldehyde oxime, 230 parts of benzoic anhydride and 500 parts of methylene chloride was charged into a suitable reaction vessel provided with means for agitation and agitated at room temperature for a period of about 75 hours. The reaction mixture was then filtered and the solvent removed under reduced pressure. The white crystalline residue was extracted with ether and air dried to obtain a product which melted at 172° C. and was identified as 1,2,3,4,5,6-hexahydro-1,3,5-triazintriyl tribenzoate.

Analysis for $C_{24}H_{18}N_3O_6$.—Calc'd (percent): C, 64.42; H, 4.73; N, 9.39. Found (percent): C, 64.17; H, 4.57; N, 9.16.

Other compounds of the present invention that can be prepared in substantially the same manner using properly substituted reactants include:

1,2,3,4,5,6-hexahydro-1,3,5-triazintriyl tri-
(o-fluorobenzoate)
1,2,3,4,5,6-hexahydro-1,3,5-triazintriyl tri-
(p-chlorobenzoate)
1,2,3,4,5,6-hexahydro-1,3,5-triazintriyl tri-
(p-fluorobenzoate)
1,2,3,4,5,6-hexahydro-1,3,5-triazintriyl tri-
(2,4-dichlorobenzoate)
1,2,3,4,5,6-hexahydro-1,3,5-triazintriyl tri-
(3,4-dichlorobenzoate)
1,2,3,4,5,6-hexahydro-1,3,5-triazintriyl tri-
(3,4-diiodobenzoate)
1,2,3,4,5,6-hexahydro-1,3,5-triazintriyl tri-
(2,4-difluorobenzoate)

1,2,3,4,5,6-hexahydro-1,3,5-triazintriyl tri-(p-nitrobenzoate)
1,2,3,4,5,6-hexahydro-1,3,5-triazintriyl tri-(m-nitrobenzoate)
1,2,3,4,5,6-hexahydro-1,3,5-triazintriyl tri-(3,5-dinitrobenzoate)
1,2,3,4,5,6-hexahydro-1,3,5-triazintriyl tri-(p-anisate)
1,2,3,4,5,6-hexahydro-1,3,5-triazintriyl tri-(p-phenetole)
1,2,3,4,5,6-hexahydro-1,3,5-triazintriyl tri-(p-propylphenylether)
1,2,3,4,5,6-hexahydro-1,3,5-triazintriyl tri-(p-hexylphenylether)
1,2,3,4,5,6-hexahydro-1,3,5-triazintriyl tri-(p-methylbenzoate)
1,2,3,4,5,6-hexahydro-1,3,5-triazintriyl tri-(p-ethylbenzoate)
1,2,3,4,5,6-hexahydro-1,3,5-triazintriyl tri-(m-isopropylbenzoate)
1,2,3,4,5,6-hexahydro-1,3,5-triazintriyl tri-(p-butylbenzoate)
1,2,3,4,5,6-hexahydro-1,3,5-triazintriyl tri-(p-isoamylbenzoate)
1,2,3,4,5,6-hexahydro-1,3,5-triazintriyl tri-(p-hexylbenzoate)
1,2,3,4,5,6-hexahydro-1,3,5-triazintriyl tri-(p-cinnamate)
1,2,3,4,5,6-hexahydro-1,3,5-triazintriyl tri-(p-phenacetate)
1,2,3,4,5,6-hexahydro-1,3,5-triazintriyl tri-(2-furoate)
1,2,3,4,5,6-hexahydro-1,3,5-triazintriyl triacetate
1,2,3,4,5,6-hexahydro-1,3,5-triazintriyl tripropionate
1,2,3,4,5,6-hexahydro-1,3,5-triazintriyl trichloroacetate
1,2,3,4,5,6-hexahydro-1,3,5-triazintriyl trichloropropionate
1,2,3,4,5,6-hexahydro-1,3,5-triazintriyl tripivalate
1,2,3,4,5,6-hexahydro-1,3,5-triazintriyl trilaurate
1,2,3,4,5,6-hexahydro-1,3,5-triazintriyl tristearate
1,2,3,4,5,6-hexahydro-1,3,5-triazintriyl tricyclopropionate
1,2,3,4,5,6-hexahydro-1,3,5-triazintriyl tricyclobutyrate The terms "insect" and "insecticide" are used herein in their broad common usage to include spiders, mites, ticks, and like pests which are not in the strict biological sense classed as insects. Thus, the term "insect" is used to refer not only to those small invertebrate animals belonging mostly to the class Insecta, comprising six-legged, usually winged forms, as beetles, bugs, bees, flies, and so forth, but also to other allied classes of arthropods whose members are wingless and usually have more than six legs, as spiders, mites, ticks, centipedes, and wood lice.

In order to demonstrate the utility of the compounds of this invention against bollworms (*Heliothis zea*), aqueous acetone solutions of 1,2,3,4,5,6-hexahydro-1,3,5-triazintriyl tribenzoate were sprayed onto two cotton plants (Rex Smoothleaf) at the 4–6 leaf stage growing in a plastic pot 4 inches square. The leaves of the sprayed cotton plants were then infested with three individually caged bollworm larvae which were 4 days old. The plants were maintained in a greenhouse and the mortality rate taken after a period of 48 hours. A 90% mortality rate was obtained with a 0.03% solution, which is equivalent to an application rate of approximately 0.6 lb./acre. Likewise, an 80% mortality rate was obtained with a 0.01% solution which is equivalent to an application rate of about 0.2 lb./acre.

The same procedure was utilized to demonstrate the activity of the compounds of this invention against the boll weevil (*Anthonomus grandis*). At concentrations of 0.05%, 40% mortality rates were obtained with 1,2,3,4,5,6-hexahydro - 1,3,5 - triazintriyl tri(o-fluorobenzoate) and also with 1,2,3,4,5,6-hexahydro-1,3,5-triazintriyl tri-(m-fluorobenzoate).

The activity of these compounds against the southern corn rootworm (*Diabrotica undecimpunctata howardi*) is demonstrated by the following:

To a growth pouch (diSPo Seed-Pak growth pouch, Catalogue No. B1220, of Scientific Products Division of American Hospital Supply Corporation, Evanston, Ill.) in an upright position is added 20 ml. of distilled water. Thereafter is added 0.1 ml. of an acetone solution of known concentration in percent by weight of a compound of this invention (for example a 0.1 ml. of a 0.1% by weight acetone solution of the compound provides a concentration of 5.0 p.p.m. thereof while 0.1 ml. of a 0.02% by weight acetone solution of the said compound provides a concentration of 1.0 p.p.m. thereof). In the trough of the pouch formed by the paper wick thereof are placed two corn seeds (*Zea mays*, Hybrid U.S. 13) about one inch apart. Thereupon to the trough and between the seeds is added 8 to 12 ready-to-hatch eggs of the southern corn rootworm (*Diabrotica undecimpunctata howardi*) which eggs were washed (with distilled water) free of the soil in which they were incubated at room temperature for 21 days immediately prior to their placement in the trough. The so-charged growth pouch is then placed in an upright position in an incubator maintained at 80° F. and 70% relative humidity for 14 days. Immediately thereafter the growth pouches are removed and the extent of kill in percent of the particular species of corn rootworm larvae observed. At a concentration of 5 p.p.m., a 60% kill was observed with 1,2,3,4,5,6-hexahydro-1,3,5-triazintriyl-tri(m-fluorobenzoate) and at the same concentration a 30% mortality rate was obtained with 1,2,3,4,5,6-hexahydro-1,3,5-triazintriyl trilaurate.

Although the compounds of this invention are useful per se in controlling a wide variety of insect pests, it is preferable that they be supplied to the pests or to the environment of the pests in a dispersed form in a suitable extending agent.

The term "dispersed" is used herein in its widest possible sense. Particles of the compounds may be molecular in size and held in true solution in a suitable organic solvent, or the particles may be colloidal in size and distributed throughout a liquid phase in the form of suspensions or emulsions, or in the form of particles held in suspensions by wetting agents. The term includes particles which are distributed in a semi-solid viscous carrier such as petrolatum or soap or other ointment base in which they may be actually dissolved in the semi-solid or held in suspension in the semi-solid with the aid of suitable wetting or emulsifying agents. The term "dispersed" also means that the particles may be mixed with and distributed throughout a solid carrier providing a mixture in particulate form, e.g. pellets, granules, powders, or dusts. The term "dispersed" also includes mixtures which are suitable for use as aerosols including solutions, suspensions, or emulsions of the compounds of the invention in a carrier such as dichloro-difluoromethane and the like which boil below room temperature at atmospheric pressure.

The expression "extending agent" as used herein includes insecticidal adjuvants and any and all of the substances in which the compounds of this invention are dispersed. It includes, therefore, the solvents of a true solution, the liquid phase of suspensions, emulsions or aerosols, the semi-solid carrier of ointments and the solid phase of particulate solids, e.g. pellets, granules, dusts and powders.

The exact concentration of the compounds of this invention employed in combatting or controlling insect pests can vary considerably provided the required dosage (i.e., toxic or lethal amount) thereof is supplied to the environment of the pests. When the extending agent is a liquid or mixture of liquids (e.g., as in solutions, suspensions, emulsions, or aerosols) the concentration of the active compound employed to supply the desired dosage generally will be in the range of 0.0001 to 50 percent by weight. When the extending agent is a semi-solid or solid, the concentration of the insecticide employed to supply the desired dosage generally will be in the range of 0.1 to 75 percent by weight. From a practical point of view, the manufacturer must supply the user with a concentrate in such form that, by merely mixing with water or solid extender (e.g. powdered clay or talc) or other low-cost material available to the user at the point of use, he will have an easily prepared insecticidal spray or particulate solid. In such a concentrate composition, the insecticide generally will be present in a concentration of 5 to 95 percent by weight, the residue being any one or more of the well-known insecticidal adjuvants, such as the various surface active agents (e.g. detergents, a soap or other emulsifying or wetting agent), surface-active clays, solvents, diluents, carrier media, adhesives, spreading agents, humectants, and the like.

There are a large number of organic liquids which can be used alone or in combination for the preparation of solutions, suspensions or emulsions of the compounds of this invention. For example, isopropyl ether, acetone, methyl ethyl ketone, dioxane, cyclohexanone, carbon tetrachloride, ethylene dichloride, tetrachloroethane, hexane, heptane and like higher liquid alkanes, hydrogenated naphthalenes, solvent naphtha, benzene, toluene, xylene, petroleum fractions (e.g. those boiling almost entirely under 400° F. at atmospheric pressure and having a flash point above about 80° F., particularly kerosene), mineral oils having an unsulfonatable residue above about 80 percent and preferably above about 90 percent. In those instances wherein there may be concern about the phytotoxicity of the organic liquid extending agent a portion thereof can be replaced by such low molecular weight aliphatic hydrocarbons as dipentene, diisobutylene, propylene trimer, and the like or suitable polar organic liquids such as the aliphatic ethers and the aliphatic ketones containing not more than about 10 carbon atoms as exemplified by acetone, methyl ethyl ketone, diisobutyl ketone, dioxane, isopropyl ether, and the like.

The insecticides of this invention can be supplied to the insect pests or to the environment of the insect pests in the form of emulsions or suspensions. Emulsions or suspensions are prepared by dispersing the compounds either per se or in the form of an organic solution thereof in water with the aid of a water-soluble surfactant. The term "surfactant" as employed herein is as used in volume II of Schwartz, Perry and Berch's "Surface Active Agents and Detergents" (1958, Interscience Publishers Inc., New York) in place of the expression "emulsifying agent" to connote generically the various "emulsifying agents," "dispersing agents," "wetting agents" and "spreading agents" that are adapted to be admixed with the active compounds of this invention in order to secure better wetting and spreading of the active ingredients in the water vehicle or carrier in which they are insoluble through lowering the surface tension of the water (see also Frear "Chemistry of Insecticides, Fungicides and Herbicides," second edition, page 280). These surfactants include the well-known capillary-active substances which may be anionic, cationic, or non-ionic which are described in detail in volumes I and II of Schwartz, Perry and Berch's "Surface Active Agents and Detergents" (1958, Interscience Publishers, Inc., New York) and also in the November 1947 issue of Chemical Industries (pages 811–824) in an article entitled "Synthetic Detergents" by John W. McCutcheon and also in the July, August, September and October 1952 issues of Soap and Sanitary Chemicals under the title "Synthetic Detergents." The disclosures of these articles with respect to surfactants are incorporated in this specification by reference in order to avoid unnecessary enlargement of this specification. The preferred surfactants are the water-soluble anionic non-ionic surface-active agents set forth in U.S. Pat. 2,846,398 (issued Aug. 5, 1958). In general, a mixture of water-soluble anionic and water-soluble non-ionic surfactants is preferred.

The compounds of this invention can be dispersed by suitable methods (e.g. tumbling or grinding) in solid extending agents either of organic or inorganic nature and supplied to the insect pests' environment in particulate form. Such solid materials, include for example, tricalcium phosphate, calcium carbonate, kaolin, bole, kieselguhr, talc, bentonite, attapulgite, fuller's earth, pyrophillite, diatomaceous earth, calcined magnesia, volcanic ash, sulfur and the like inorganic solid materials as well as organic materials such as powdered cork, corn husks, corn cobs, powdered wood, and powdered walnut shells. The preferred solid carriers are the adsorbent clays, e.g. diatomaceous earth. These mixtures can be used for insecticidal purposes in the dry form, or by addition of water-soluble surfactants or wetting agents the dry particulate solids can be rendered wettable by water so as to obtain stable aqueous dispersions or suspensions suitable for use as sprays. When used in the dry form, the preferred carrier is diatomaceous earth, and the concentration of the present pesticides on this carrier is normally between about 10 and 50% by weight of the total composition. For most practical purposes, the concentration is normally maintained between about 20 and 30%. A typical composition contains about 25% of a pesticide of the present invention and about 75% diatomaceous earth.

For special purposes the compounds of this invention can be dispersed in a semi-solid extending agent such as petroleum or soap (e.g. sodium stearate or oleate or palmitate or mixtures thereof) with or without the aid of solubility promoters and/or surfactants or dispersing agents.

In all of the forms described above, the dispersions can be provided ready for use in combatting insect pests or they can be provided in a concentrated form suitable for mixing with or dispersing in other extending agents. As illustrative of a particularly useful concentrate is an intimate mixture of a compound of this invention with a water-soluble surfactant in the weight proportions of 0.1 to 15 parts of surfactant with sufficient sulfinate to make 100 parts by weight. Such a concentrate is particularly adapted to be made into a spray for combatting the insect pests by the addition of water thereto.

Another useful concentrate adapted to be made into a spray for combatting a variety of insect pests is a solution (preferably as concentrated as possible) of a compound of this invention in an organic solvent therefor. The said liquid concentrate preferably contains dissolved therein a minor amount (e.g. 0.5 to 10 percent by weight of the weight of the new insecticidal agent) of a water-soluble surfactant (or emulsifying agent).

Of the surfactants aforementioned in preparing the various emulsifiable, wettable or dispersible compositions or concentrates of this invention, the anionic and non-ionic surfactants are preferred. Of the anionic surfactants, the particularly preferred are the well-known water-soluble alkali metal alkylaryl sulfonates as exemplified by sodium decylbenzene sulfonate and sodium dodecylbenzene sulfonate. Of the non-ionic surfactants, the particularly preferred are the water-soluble polyoxyethylene derivative of alkylphenols (particularly isooctylphenol) and the water-soluble polyoxyethylene derivatives of the mono-higher fatty acid esters of hexitol anhydrides (e.g. sorbitan). These materials in general contain 15 to 30 moles of ethylene oxide per mole of the hexitol anhydride or the alkylphenol.

The compositions of this invention can also contain other additaments such as fertilizers and pesticides used as, or in combination with, the carrier materials. For example, the insecticides useful in combination with the above-described compounds include parathion, methyl parathion, pyrethrine, nicotine, aldrin, chlordane, heptachlor, toxaphene, Malathion, 2-isopropoxyphenyl N-methylcarbamate, O,O,O,O-tetramethyl O,O'-thiodo-p-phenylene phosphorothioate, dimethyl phosphate of 3-hydroxy-N-methyl-cis-crotonamide, fenthion, carbofuran, mirex, DDT, dicofol, methoxychlor, dichlorvos, demeton, dimethoate, carbophenothion, ronnel, carbaryl, azinphos-methyl, methomyl, aldicarb and the like.

In controlling or combatting insect pests the compounds of this invention either per se or compositions containing them are supplied to the insect pests or to their environment in a lethal or toxic amount. This can be done by dispersing the new insecticidal agent or insecticidal composition comprising same in, on or over agricultural soil or other growth media or other media infested with insect pests or attractable to the pests for habitational or sustenance or propagational purposes, in any conventional fashion which permits contact between the insect pests and the compounds of this invention. Such dispersing can be brought about by applying sprays, dips or particulate solid compositions to a surface infested with the insect pests or attractable to the pests. Also for sub-surface application such dispersing can be carried out by simply mixing the new insecticidal agent per se or insecticidal spray or particulate solid compositions comprising same with the infested environment or with the environment the insect pests frequent, or by employing a liquid carrier for the new insecticidal agent to accomplish sub-surface penetration and impregnation therein.

While this invention has been described with respect to certain embodiments, it is to be understood that it is not so limited and that variations and modifications thereof obvious to those skilled in the art can be made without departing from the spirit and scope thereof.

What is claimed is:

1. A method of controlling insects which comprises bringing into contact with the insects an insecticidal effective amount of a compound of the formula

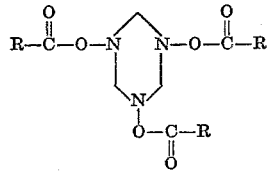

wherein R is alkyl or haloalkyl having at least 1 and a maximum of 18 carbon atoms, cycloalkyl having at least 3 and a maximum of 4 carbon atoms, phenylalkyl having at least 7 and a maximum of 8 carbon atoms, phenylalkenyl having at least 8 and a maximum of 9 carbon atoms, furan, or a substituted phenyl of the formula

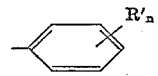

wherein R' is selected from the group consisting of hydrogen, alkyl or alkoxy having at least 1 and a maximum of 6 carbon atoms, nitro or halogen, and $n$ is an integer from 0 through 4.

2. A method in accordance with claim 1 in which R is substituted phenyl.

3. A method in accordance with claim 1 in which the compound is 1,2,3,4,5,6-hexahydro-1,3,5-triazintriyl tribenzoate.

4. A method in accordance with claim 1 in which R is alkyl having at least 1 and a maximum of 18 carbon atoms.

5. A method in accordance with claim 1 in which the compound is 1,2,3,4,5,6-hexahydro-1,3,5-triazintriyl trilaurate.

6. A method in accordance with claim 1 in which R' is halogen.

7. An insecticidal composition comprising an insecticidal adjuvant containing therein a surface active agent and an insecticidally effective amount of a compound of the formula

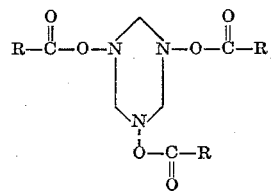

wherein R is alkyl or haloalkyl having at least 1 and a maximum of 18 carbon atoms, cycloalkyl having at least 3 and a maximum of 4 carbon atoms, phenylalkyl having at least 7 and a maximum of 8 carbon atoms, phenylalkenyl having at least 8 and a maximum of 9 carbon atoms, furan, or a substituted phenyl of the formula

wherein R' is selected from the group consisting of hydrogen, alkyl or alkoxy having at least 1 and a maximum of 6 carbon atoms, nitro or halogen, and $n$ is an integer from 0 through 4.

8. A composition in accordance with claim 7 in which R is substituted phenyl.

9. A composition in accordance with claim 7 in which the compound is 1,2,3,4,5,6-hexahydro-1,3,5-triazintriyl tribenzoate.

10. A composition in accordance with claim 7 in which R is alkyl having at least 1 and a maximum of 18 carbon atoms.

11. A composition in accordance with claim 7 in which the compound is 1,2,3,4,5,6-hexahydro-1,3,5-triazintriyl-trilaurate.

12. A composition in accordance with claim 7 in which R' is halogen.

References Cited
UNITED STATES PATENTS 3,065,232  11/1962  George _____ 260—248
3,108,101  10/1963  George et al. _____ 260—248

OTHER REFERENCES

Dunstan et al., J.A.C.S., vol. 73 (1898), pp. 353–361.
Krassig et al., Die Makromolekulare Chemie, vol. 22 (1957), p. 174.

SAM ROSEN, Primary Examiner

UNITED STATES PATENT OFFICE
CERTIFICATE OF CORRECTION

Patent No. 3,755,580         Dated May 30, 1974

Inventor(s) John E. Franz

It is certified that error appears in the above-identified patent and that said Letters Patent are hereby corrected as shown below:

Column 1, at line 13, "orf" should read - - or - -.

Column 2, at line 9, "butylbenzzoyl" should read - - butylbenzoyl - -.

Column 2, at line 68, immediately following the chemical name "1,2,3,4,5,6-hexahydro-1,3,5-triazintriyl tri-(3,4-dichlorobenzoate)", please insert - - 1,2,3,4,5,6-hexahydro-1,3,5-triazintriyl tri-(3,4-dibromobenzoate) - -.

Column 5, at line 70, "volumes" should read - - Volumes - -.

Column 6, at line 70, "rivative" should read - - rivatives - -.

Column 7, at line 7, "Malathion," should read - - malathion, - -.

Column 7, Claim 1, at line 44, "insecticidal" should read - - insecticidally - -.

Column 8, Claim 5, at line 10, "-1,3,5-tfiazintriyl" should read - -   -1,3,5-triazintriyl - -.

Column 8, Claim 11, at line 51, "-1,3,5-triazintriyl-" should read - -   -1,3,5-triazintriyl - -.

Signed and sealed this 1st day of October 1974.

(SEAL)
Attest:

McCOY M. GIBSON JR.
Attesting Officer

C. MARSHALL DANN
Commissioner of Patents